United States Patent [19]
Vouillemin

[11] 3,923,585
[45] Dec. 2, 1975

[54] METHOD AND APPARATUS FOR THE CLOSING BY TRAMSVERSE WELDING OF FLEXIBLE TUBES MADE OF METAL-THERMOPLASTIC LAMINATE

[75] Inventor: Jean-Marie Vouillemin, Ste-Menehould, France

[73] Assignee: Turboplast-France, Paris, France

[22] Filed: June 3, 1974

[21] Appl. No.: 475,425

Related U.S. Application Data

[62] Division of Ser. No. 342,689, March 19, 1973, Pat. No. 3,837,961.

[30] Foreign Application Priority Data
Mar. 23, 1972 France .............................. 72.10240

[52] U.S. Cl. ................................. 156/380; 156/498
[51] Int. Cl.² ..................... B32B 19/02; B32B 31/00
[58] Field of Search ............ 156/272, 380, 583, 498

[56] References Cited
UNITED STATES PATENTS

| | | | |
|---|---|---|---|
| 2,749,020 | 6/1956 | Baxter | 156/499 |
| 3,326,735 | 6/1967 | Beason | 156/272 |
| 3,632,943 | 1/1972 | Engler et al. | 156/380 |

*Primary Examiner*—Douglas J. Drummond

[57] ABSTRACT

Method and apparatus for closing by transverse welding of flexible tubes formed of a metal-thermoplastic laminate, in which the end of the flexible tube is gripped in a manner to create a transverse rectilinear closure zone, in which the zone is pre-heated by the application of external heat and welding is completed by induction heating.

3 Claims, 5 Drawing Figures

METHOD AND APPARATUS FOR THE CLOSING BY TRAMSVERSE WELDING OF FLEXIBLE TUBES MADE OF METAL-THERMOPLASTIC LAMINATE

This is a division, of application, Ser. No. 342,689, filed Mar. 19, 1973 now U.S. Pat. No. 3,837,961.

This invention relates to a method and apparatus for effecting closure of flexible tubular members formed of metal-thermoplastic laminate by transverse welding of the open end.

The invention is concerned with the field of flexible tubular members in which utilization is made of permanent deformation to effect the discharge of content material.

A flexible tubular member of the type described is formed with a body portion of cylindrical or frustoconical configuration, the small base mounting the dispensing head while the lower end is closed after the tube has been filled.

The flexible tubular body portion is known to be formed of a laminate comprising at least one impervious layer and two layers of thermoplastic material, with the layers alternately arranged, preferably with the impervious layer sandwiched between the layers of thermoplastic material. At least one of the impervious layers is metal, such for example as aluminum. The flexible tubular body portion is formed by overlapping the lateral edges of the laminate to provide an outside overlapping portion and an inside overlapping portion which extend longitudinally of the tubular member. Joinder of the overlapping portions is made by applying heat and pressure so that a certain portion of the thermoplastic material flows from the overlap area towards the areas immediately adjacent the overlap. This causes a reduction in thickness for the overlap area and the formation of ridges of thermoplastic material which extend from the sections of the overlapping portion.

Transverse closure of a tubular member of the type described is made difficult by reason of the presence of the longitudinal joint. Along the overlapped longitudinal joint, the number of metal layers is double that beyond the joint, while the outer thermoplastic layers which are employed in the transverse welding operation, although reduced in thickness, form an area of increased thickness.

Welding is effected by reducing the two contacting thermoplastic layers to the plastic state and then compressing the joint in a cold gripping means which causes flow of portions of thermoplastic material for autogeneous welding. This results in the formation of an external ridge along the section external of the tubular member and an internal ridge along the junction zone.

It is known to make the above described weld by the application of external heat, i.e. heat generated outside of the joint to be formed, as by infra-red radiation or by heated jaws, but the necessity to heat the thermoplastic of the internal layer to welding temperature gives rise to the danger of overheating of the thermoplastic material in the internal layer. In addition, this procedure is slow.

It is also known to effect the weld by the use of internal heat, i.e. that which is produced in the joint to be made, as by induction heating. Under such conditions, the heat is produced in the layer or layers of metal which form a virtually closed circuit, but which is interrupted in line with the longitudinal joint. At that point, there are two layers of metal separated by a thin film of thermoplastic material such that the amount of heat is doubled. This causes excessive heating of the thermoplastic material in the internal layer and leads to carbonization thereof. In addition, in the case of a composite material which is asymmetric with respect to the aluminum sheet, the thermoplastic material in the thicker external layer is only partially heated to the plastic stage. As a result, its outer portion remains almost cold while the inner portion is softened. As a result, when the tube is gripped in the cold gripping means, in the end zones which are highly curved, the cold portion of the layer of thermoplastic material tends to split. In contrast to the previous method, this method of procedure is faster and, not to say brutal.

In the French Pat. No. 1,497,846, description is made of a method for closing by transverse welding of a flexible tube, as by longitudinal welding of the laminate wherein the end of the tube is compressed between two jaws, only one of which is provided with an induction heating means. Longitudinal welding must necessarily be in contact with the noninductive jaw.

This method requires the longitudinal joint to be oriented with respect to the tool for making the transverse joint. This disadvantage is of importance when the finished tube must carry printing, an inscription or a drawing. In the case where the printing is applied after the longitudinal weld, the tool for making the transverse weld is oriented relative to the printing. It is impractical to orient the tool relative both to the printing and to the longitudinal joint.

It is an object of this invention to provide a method for closing by transverse welding a flexible tube produced by longitudinal welding of a metal-thermoplastic laminate, the outside layers of which comprise a thermoplastic material and which avoids the above-mentioned disadvantages, and it is a related object to provide an apparatus for carrying out the same.

These and other objects of this invention will hereinafter appear and for purposes of illustration, but not of limitation, an embodiment of the invention is shown in the accompanying drawings, in which FIG. 1 is a cross-sectional view of an embodiment of a laminate employed in the practice of this invention;

In accordance with the practice of this invention, the end of the tube, which is to be closed, is gripped so as to create a transverse rectilinear closure zone, said zone is pre-heated by the application of external heat, then the weld is completed by means of induction heating, followed by cooling of the joint produced.

The apparatus according to the invention comprises a gripping means for flattening the open part of the tube comprising two jaws of an electrically insulating material and resistant to infra-red rays, an induction welding means comprising two gripping means, each provided with a cooling means and at least one of which includes an induction means, and a cooling means. Upstream of the induction welding means, there is an infra-red radiation pre-heating means comprising at least one radiating resistor, the assembly of said resistors being surrounded by a reflector for concentrating the radiation onto the end of the tube which projects beyond the jaws of the flattening gripping means.

The flexible tubes are formed of a metal-thermoplastic laminate material, having at least one metal sheet, such as aluminum, which is sandwiched between two thermoplastic sheets such as of polyethylene. The laminate can be formed of a larger number of layers, while the above-mentioned metal sheet can be replaced for example by two metal sheets joined by a thermoplastic sheet, or by a metal sheet and a paper sheet which are joined together by way of a thermoplastic sheet.

Figure 1:
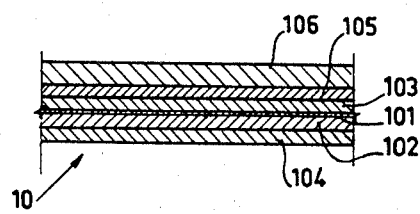

The laminate 10, illustrated in FIG. 1, comprises an aluminum sheet 101 covered on each of its faces by a layer 102 and 103 of a polyethylene copolymer and a polyethylene layer 104 and 105. The face which is intended to form the outside surface of the tube is covered by a second polyethylene layer 106 having a thickness greater than that of the preceding layer 105. The outside layer 106 can be deposited either on the laminate before the tube is produced or on the finished tube body, before filling and closing thereof. This laminate is physically asymmetric relative to the metal sheet, and this is shown by an asymmetry in the transfer of heat in the welding operation. The asymmetry is further accentuated by the poor heat conductivity of plastic materials. This does not prevent the method of this invention from achieving a perfect closure of the tube.

Figure 2:
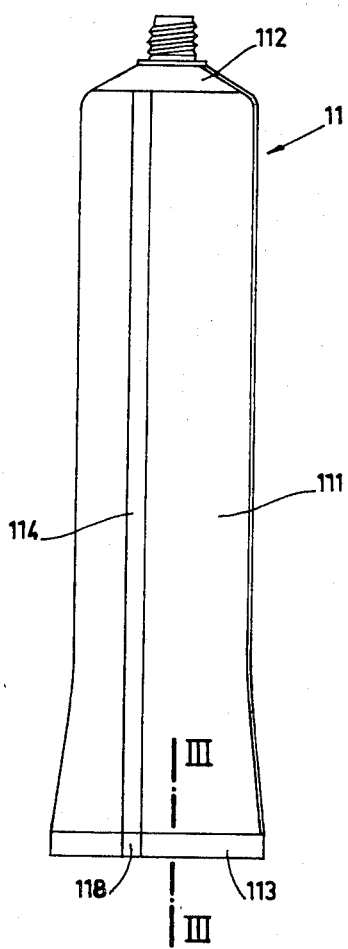
FIG. 2 is a side elevational view of a flexible tube produced in accordance with the practice of this invention.
Figure 3:
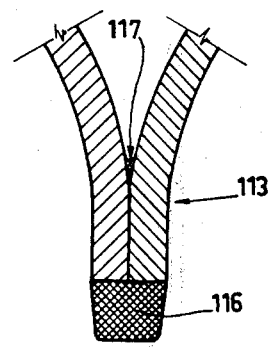
FIG. 3 is a cross-sectional view taken along the line III in FIG. 2, showing the transverse joint for closing the flexible tube.

The flexible tube 11, shown in FIG. 2, is formed from such a laminate. It comprises a cylindrical or frustoconical body 111 which is produced by longitudinal welding of overlapping edge portions of the laminate to form a joint 114, which extends longitudinally through the length of the tubular member. One of the ends, the small base in the case of a frustoconical body, is provided with a dispensing head 112 which is preferably produced by molding onto the body, while the other end is sealed after filling by a transverse joint 113.

The transverse joint 113 is made by subjecting the open end bottom end portion of the tube to pressure, and heating. The material of the thermoplastic layers is softened and flows, thus forming an internal ridge 117 and an external ridge 116 which extends towards the outside of the joint and which is welded to the thermoplastic layers and, in particular, to the outside layer 106. The difficulty in this operation arises from the presence in the transverse joint 113 of an area 118 which also forms part of the longitudinal joint. Although, during the formation of the longitudinal joint, the layers of thermoplastic material have been reduced in thickness, their total thickness in the area 118 remains greater than that of the adjacent layers, and there are two metal layers at that point instead of one. Tests, involving making the transverse joint by induction heating, show that with apparatus whose current output is 3.85 KVA, the formation of a properly produced joint, outside of the area 118 which is common to the two joints, requires a heating period of 1 second. However, it has been found that many welded tubes are "burnt" in the area 118 and that the outside layer 106 has split. Burning is worse when the laminate includes a paper sheet.

This disadvantage is overcome if pre-heating by infra-red radiation is effected, by means of two resistances consuming a power of 300 watts, and positioned 6 mm from the gripped end of the tube for a period of 2 seconds, followed by welding with the same induction apparatus, but for a period of only 0.6 second. A good joint is produced, without burning and without splitting the thermoplastic material. The position of the area 118 on the transverse joint 113 can be anywhere, so that the orientation of the plane 119 of the latter need take into account only the position of printing on the tube body.

Figure 4:
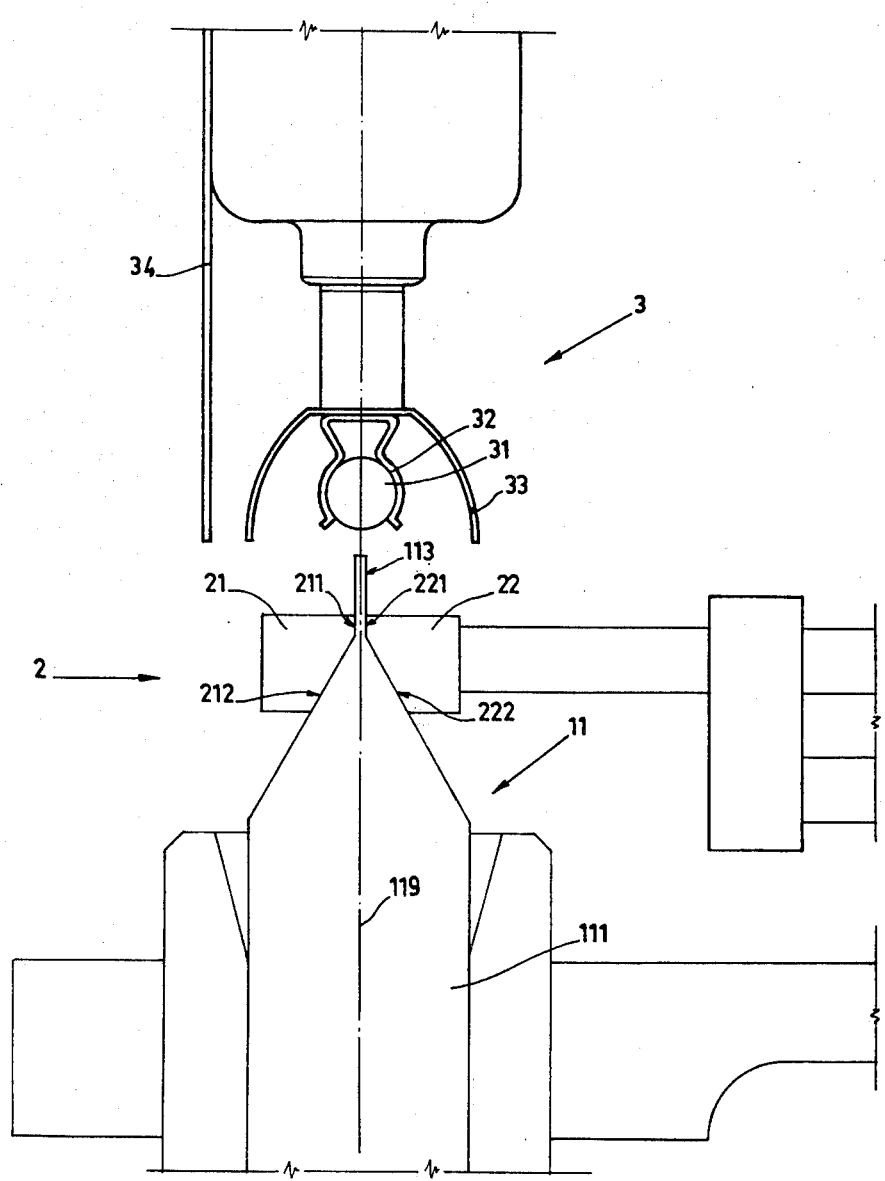
FIG. 4 is an elevational view showing the gripping means for flattening the end of the tube which is to be closed, and the pre-heating means.

The apparatus shown in FIG. 4 comprises a gripping means 2 for flattening the open end of the tube 11. The gripping means 2 comprises two jaws 21 and 22 of an electrically insulating material which is resistant to infra-red radiation, such as those marketed under the trade names Celoron, or Teflon (polytetrafluoroethylene). The operative surfaces of the jaws 21 and 22 comprise a flat portion 211 and 221 respectively, parallel to the plane 119 of the joint 113, and another flat portion 212 and 222 respectively, which extend outwardly in opposite directions at an acute angle from the respective flat portions 211 and 221. The portions 212 and 222 are symmetrical relative to the plane 119. The two jaws 21 and 22 can be opened or closed by displacement symmetrical relative to the plane 119 in the direction away from and toward each other respectively.

The infra-red pre-heating means 3 (FIG. 4) comprises one or more electrical resistances 31 emitting infra-red radiation. In the embodiment illustrated, these resistances are in the form of a tube and are secured by tube-carrier clips 32 forming current connections. A reflector 33 surrounds the assembly, for concentrating the radiation onto the end of the tube 11 which projects beyond the jaws 21 and 22 of the gripping means 2. The means 3 is secured to a frame 34 which is adjustable in height, for example by rotation of a screw in a nut which is secured to the frame (not shown), thereby permitting the distance of the tube 31 from the joint 113 to be made, to be adjusted.

Figure 5:
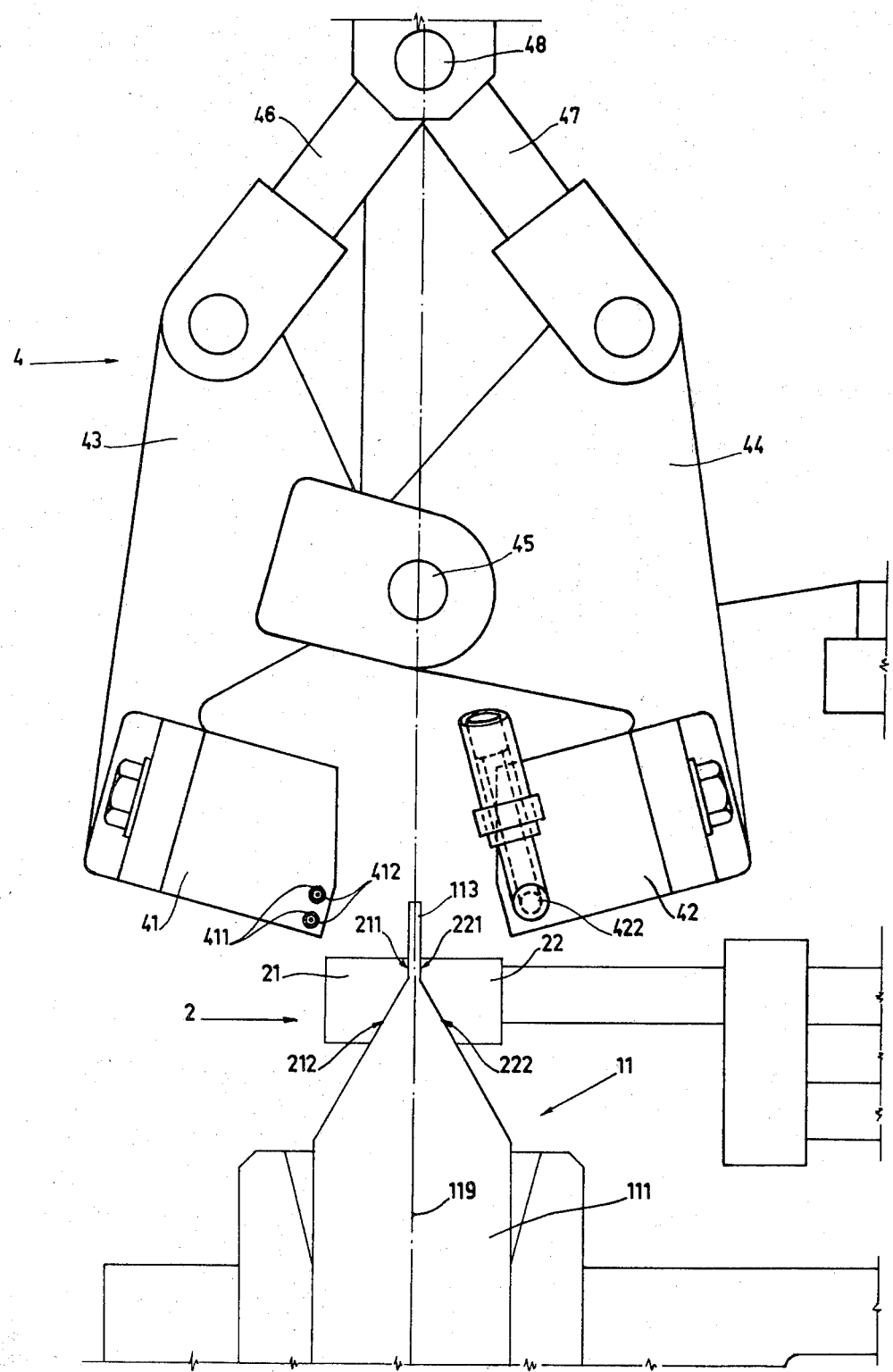
FIG. 5 is a top plan view of the induction welding means.

The induction welding means 4 (FIG. 5) comprises two jaws 41 and 42, formed for example of a material known in the trade under the name of "Araldite". The two jaws 41 and 42 are secured to respective arms 43 and 44 mounted for pivotal movement on a shaft 45 and are actuated by links 46 and 47. The links 46 and 47 are pivoted on a shaft 48, controlled for example by a pneumatic jack (not shown). The jaw 41 comprises an insulating block molded around a hollow tubular conductor 411 forming the induction means. A cooling means 412 such as water is circulated through the conductor 411. The jaw 42 can be identical. In the preferred practice the jaw 47 does not have any induction means but only a water cooling means 422. It thus forms an anvil jaw. The jaws come together when the jack effects downward displacement of the shaft 48 and the jaws move apart in response to movement of the shaft in the upward or opposite direction.

Final cooling is effected by exposing the resulting joint to air, the gripping means 2 remaining in the clamping position.

In operation, the tube body 111, upon which is mounted the dispensing head 112 and which has received the desired printing, is turned over so that its open bottom end or base is directed upwardly. The substance which the tube is to contain is then poured therein. After orientation relative to the printing on the tube, the open end of the tube is introduced between the jaws 21 and 22 of the gripping means 2. The jaws 21 and 22 are moved together so as to flatten the end of the tube, care being taken to insure that the end of the tube projects beyond the jaws by the desired amount, a little more than that required for the joint 113. The end is then introduced below the pre-heating means for the required time, for example for 2 seconds, for induction tubes with a total power of 600 watts, positioned at 6 mm from the end of the joint 113. Finally, the tube body, while still being clamped in the gripping means 2, is engaged between the jaws 41 and 42 in the open condition of the induction-welding means 4. In response to actuation of the jack to move the shaft 48 downwardly, the jaws 41 and 42 come together, strongly clamping the end 113 of the tube 11 between them. The induction means is then supplied with electrical current for the desired time, for example 0.6 second for a 3.85 KVA apparatus. The current is then stopped and the jaws are moved away from each other in response to raising the shaft 48 as by means of the jack. It then only remains to open the gripping means 2, to remove the finished tube 11.

The apparatus is normally mounted on an automatic machine comprising multiple working stations, the tubes passing successively from one station to the next. The movement of the tubes can be linear or circular, in the latter case the various stations being mounted on a horizontal plate which rotates about a vertical axis. A machine of this type is described in French Pat. No. 1,069,414. This described machine comprises 11 stations, but the number of stations is here raised to 12, namely:

1. a tube-charging station;
2. a station for setting the tubes at the desired height;
3. a station for detecting the presence of a tube, this station comprising for example a light ray which is intercepted by the tube and which, if it acts on a photoelectric cell or on a photo-sensitive resistor, blocks the following station;
4. a tube filling station;
5. a free station;
6. and 7. two infra-red radiation pre-heating stations, which comprise only a single apparatus extending over the two stations;
8. and 9. two induction-welding stations, each station comprising an inductive gripping means (41 – 42);
10. and 11. two free stations, for permitting cooling of the transverse weld in free air;
12. a station for ejecting the finished tubes.

Each station can receive a plurality of tubes at once, gripped in the same gripping means (21 – 22).

It will be apparent from the foregoing that there is described an invention for closing flexible tubes of a metal-thermoplastic laminate, by means of a transverse joint, after the tubes have been filled.

It will be understood that changes may be made in the details of arrangement and operation without departing from the spirit of the invention, especially as defined in the following claims.

I claim:

1. Apparatus for closing the open end portion of flexible tubes formed with a thermoplastic interlayer by transverse welding of the flexible tube comprising
   1. a pair of jaws mounted for movement into and out of gripping engagement with the opposite side of a portion of the tube adjacent the open end to flatten and to grip the flattened end portion of the tube with a free end portion extending beyond the jaws when in gripping engagement;
   2. an infrared radiation means beyond the gripping jaws for directing radiations onto the free flattened end portion of the tube extending beyond the jaws to pre-heat said portion, and
   3. a pair of welding jaws mounted for movement into and out of engagement with the pre-heated flattened free end portion of the tube extending beyond the gripping jaws, at least one of said welding jaws embodying induction heating means additionally to heat the free flattened end portion of the tube extending beyond the gripping jaws and to weld the same when in position of engagement with the tube, said welding jaws also embodying cooling means for setting the weld.

2. Apparatus as claimed in claim 1 which includes reflector means for concentrating the radiations onto the flattened end portion of the tube extending beyond the gripping means.

3. Apparatus as claimed in claim 1 in which the infrared radiation means comprises at least one radiating electrical resistance means and which includes a reflector surrounding resistance means for concentrating the radiations onto the end of the tube which projects beyond the gripping means.

* * * * *